United States Patent [19]
Jeong

[11] Patent Number: 5,653,463
[45] Date of Patent: Aug. 5, 1997

[54] HYBRID INFLATING ASSEMBLY USING A PROJECTILE

[75] Inventor: Jae-Ho Jeong, Seoul, Rep. of Korea

[73] Assignee: Daewoo Electronics Co, Ltd., Seoul, Rep. of Korea

[21] Appl. No.: 582,737

[22] Filed: Jan. 4, 1996

[30] Foreign Application Priority Data

Jun. 30, 1995 [KR] Rep. of Korea .............. 95-18583

[51] Int. Cl.⁶ .................................................. B60R 21/26
[52] U.S. Cl. .................................. 280/737; 222/5
[58] Field of Search .................... 280/737, 741, 280/736; 222/5; 102/530, 531

[56] References Cited

U.S. PATENT DOCUMENTS

| | | | |
|---|---|---|---|
| 3,648,898 | 3/1972 | Day | 280/737 |
| 3,690,695 | 9/1972 | Jones | 280/741 |
| 3,788,667 | 1/1974 | Vancil | 222/5 |
| 3,797,853 | 3/1974 | Grosch et al. | 280/740 |
| 3,868,124 | 2/1975 | Johnson | 102/530 |
| 3,948,540 | 4/1976 | Meacham | 222/5 |
| 4,018,457 | 4/1977 | Marlow | 222/5 |
| 5,273,312 | 12/1993 | Coultas et al. | 280/737 |
| 5,344,186 | 9/1994 | Bergerson et al. | 280/737 |

*Primary Examiner*—Paul N. Dickson
*Attorney, Agent, or Firm*—Beveridge, DeGrandi, Weilacher & Young LLP

[57] ABSTRACT

A hybrid inflator for an airbag system using a projectile is disclosed. The projectile includes a rod portion and a stop end portion larger in diameter than the rod portion, a plurality of grooves functioning as a passageway of the gas flow are formed on the rod portion, and an end of the rod portion tapers to a point. The inflator includes an actuator assembly in which the projectile and a propellant are retained. The actuator assembly is secured to a container storing a pressured gas so that a portion of the actuator assembly projects into the container. A blocking cap isolates the container from the actuator assembly. When the airbag system initiates activating, projectile ruptures a circular upper surface of the blocking cap and a burst disk and the hot combustion gases tear away portions of side wall of the blocking cap. The combustion gases are introduced in the container through the torn portions of side wall of the blocking cap and are mixed with the pressured gas to raise the pressure and temperature of the container. Consequently, an air pressure is generated which is sufficient to inflate the airbag.

10 Claims, 7 Drawing Sheets

HYBRID INFLATING ASSEMBLY USING A PROJECTILE

BACKGROUND OF THE INVENTION

1. Field of the Invention

The present invention relates to an airbag system for automotive vehicles, and more particularly to an inflating assembly for an airbag system using a projectile launched by ignition of a propellant and having improved performance for blowing out the gas.

2. Description of the Prior Art

Airbag systems for automotive vehicles have undergone significant development efforts in recent years due to an increased awareness as to their effectiveness. These airbag systems are typically activated upon receipt of a signal from an appropriate detector or sensor which indicates that inflation of the airbag is required. A variety of inflators are used by these systems to expand the airbag in a manner which provides certain advantages. Many systems initiate inflation by removing an isolation between the airbag and the inflator. Thereafter, some inflating medium, whether it may be pressured gases, gases generated by combustion of a propellant, a mixture thereof, or other suitable fluids, is supplied to the airbag.

A portion of the development efforts for airbag systems has concentrated upon controlling the flow from the inflator to the airbag after inflation has been initiated. In order to provide a reliable airbag system, not only there must be a sufficient flow of the inflating medium to the airbag in a timely manner, but the airbag must remain structurally intact throughout operation. As one proposed alternative for achieving these two fundamental objectives, the propellant-type airbag system that gases generated by combustion of a propellant are supplied to the airbag has been developed.

However, this type system suffers from many deficiencies, since filtering devices for controlling flow from the inflator to the airbag and lowering the temperature of gases generated by combustion are required. For instance, the filtering devices may not retain all the particles generated upon activation of the inflator. Consequently, some particles may pass through the filtering device to restrict the flow to the airbag or some may enter the airbag. Both these cases may adversely affect performance of the airbag system. Even if the filtering device properly functions and retains all the generated particles, this may induce a further flow restriction to the airbag by blocking an entire passageway or a portion thereof. Moreover, cost of manufacturing and maintenance of the inflator is raised by using the filtering device.

As one proposed alternative for solving the above deficiencies, the inflator that employs a projectile to remove the isolating member has been developed. U.S. Pat. No. 3,788,667 to Vancil, issued Jan. 29, 1974, discloses a piston-like member to remove a barrier isolating the inflator from the airbag. U.S. Pat. No. 3,836,170 to Grosch et al., issued Sep. 17, 1974, discloses a blunt nosed projectile which tapers to a degree but not to a point.

However, the removal of the barrier by the blunt nosed projectile of Grosch et al. is not controlled. That is, the tearing pattern will typically vary dependent upon various factors. As a result of inconsistent and uncontrolled tearing of the barrier, operational performance of the airbag system is degraded, so that occupants may not be protected enough.

A large number of the airbag systems use two types of sources, typically a compressed gas which is stored at ambient temperature, i.e., a cold gas, and gases generated by combustion of a propellant, i.e., a hot gas. For instance, U.S. Pat. No. 5,273,312 to Coultas et al., issued Dec. 28, 1993, discloses releasing a stored gas by removal of an isolation and thereafter activating an inflator. More particularly, a longitudinal through hole extends through the piston which is employed as a projectile and therethrough hot products generated by combustion of pyrotechnic charge are transferred to ignite booster charge. By burning the booster charge, the body of pyrotechnic material is ignited to generate hot gases. The generated gases are mixed with a gas stored in a container. Score lines are formed on burst disk and it is ruptured with a predetermined pattern.

SUMMARY OF THE INVENTION

The present invention is devised to solve the above deficiencies. An object of the present invention is to provide a hybrid inflating assembly having a simple structure, and ensuring the consistent and controlled flow of gases irrelevant to tearing pattern of a burst disk.

To achieve the above object of the present invention, there is provided a hybrid inflator comprising:

pressured container means having first opening and second opening opposite to the first opening for storing gas under pressure;

blocking means for blocking a gas flow toward an airbag in a normal state in which the airbag is kept deflated, the blocking means being secured to the container means to close the first opening provided to one end of the container means;

projectile means located coaxially opposite to the blocking means for being launched by burning a propellant and rupturing the blocking means to inflate the airbag;

hollow guiding means for containing the projectile means and guiding the projectile means toward the blocking means, the guiding means having a chamber for receiving and moving the projectile means and being coupled with the container means through the second opening which is provided to the other end of the container means opposite to one end thereof so that a portion of the guiding means is received inside the container means;

hollow casing means being coaxially coupled with one end portion of the guiding means outside the container means and retaining the propellant to generate combustion gases;

sealing means for sealing the container means against the guiding means so that a gas under pressure is stored within the container means; and ignition means for igniting the propellant, the ignition means being disposed in the chamber inside the casing means adjacent to the propellant, wherein the projectile means includes a rod portion and a stop end portion larger in diameter than the rod portion, one end of the rod portion tapers to a point to rupture the blocking means easily, and a plurality of grooves functioning as passageway of the gas flow are formed on the rod portion along the longitudinal direction.

For instance, the grooves are extended either straight or spirally rotating a predetermined degree.

BRIEF DESCRIPTION OF THE DRAWINGS

The above object and other advantages of the present invention will become more apparent by describing in detail preferred embodiments thereof with reference to the attached drawings in which.

DETAILED DESCRIPTION OF THE PREFERRED EMBODIMENT

Figure 1:
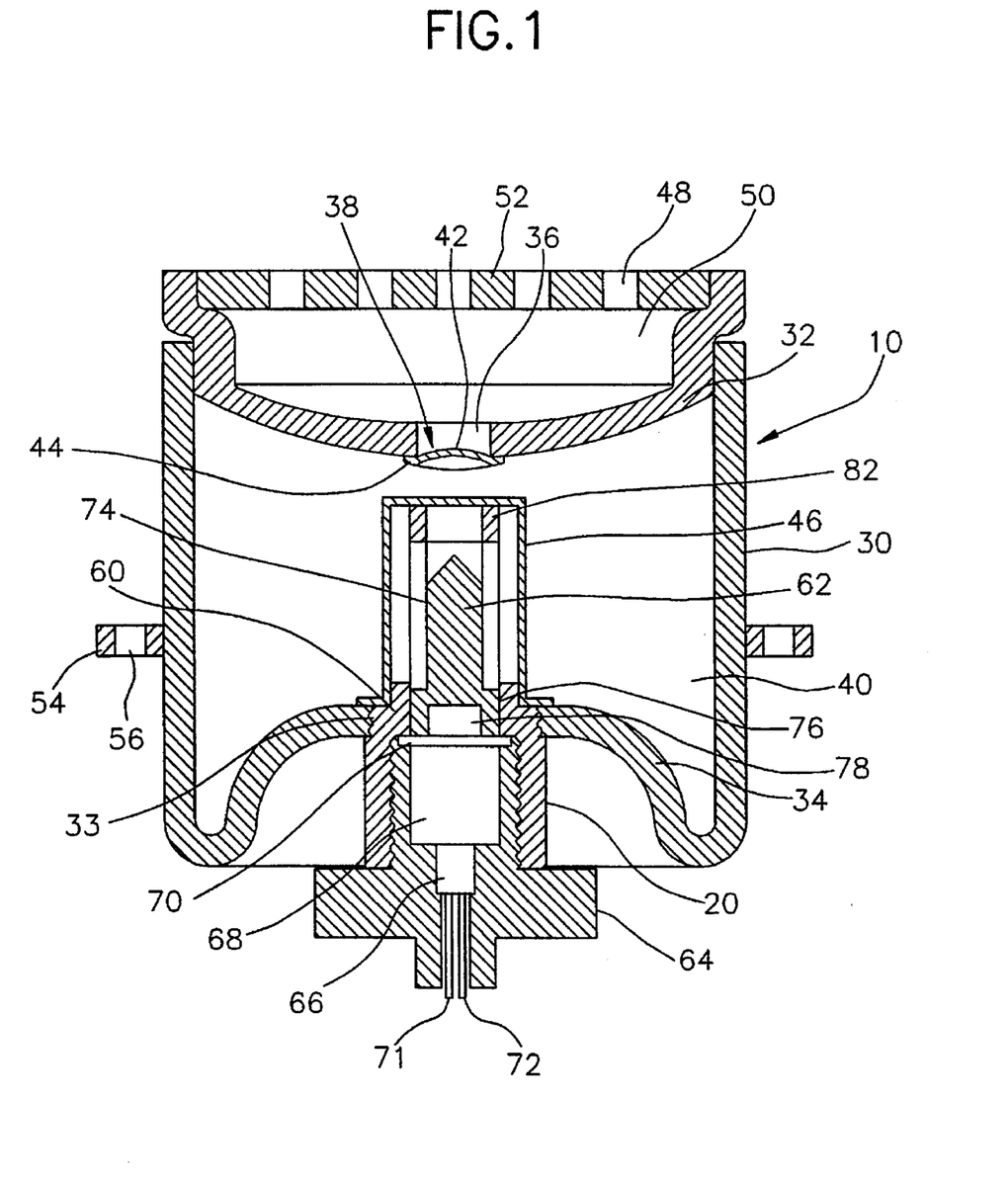
FIG. 1 is a sectional view of an inflating assembly in accordance with the present invention.
Figure 2:
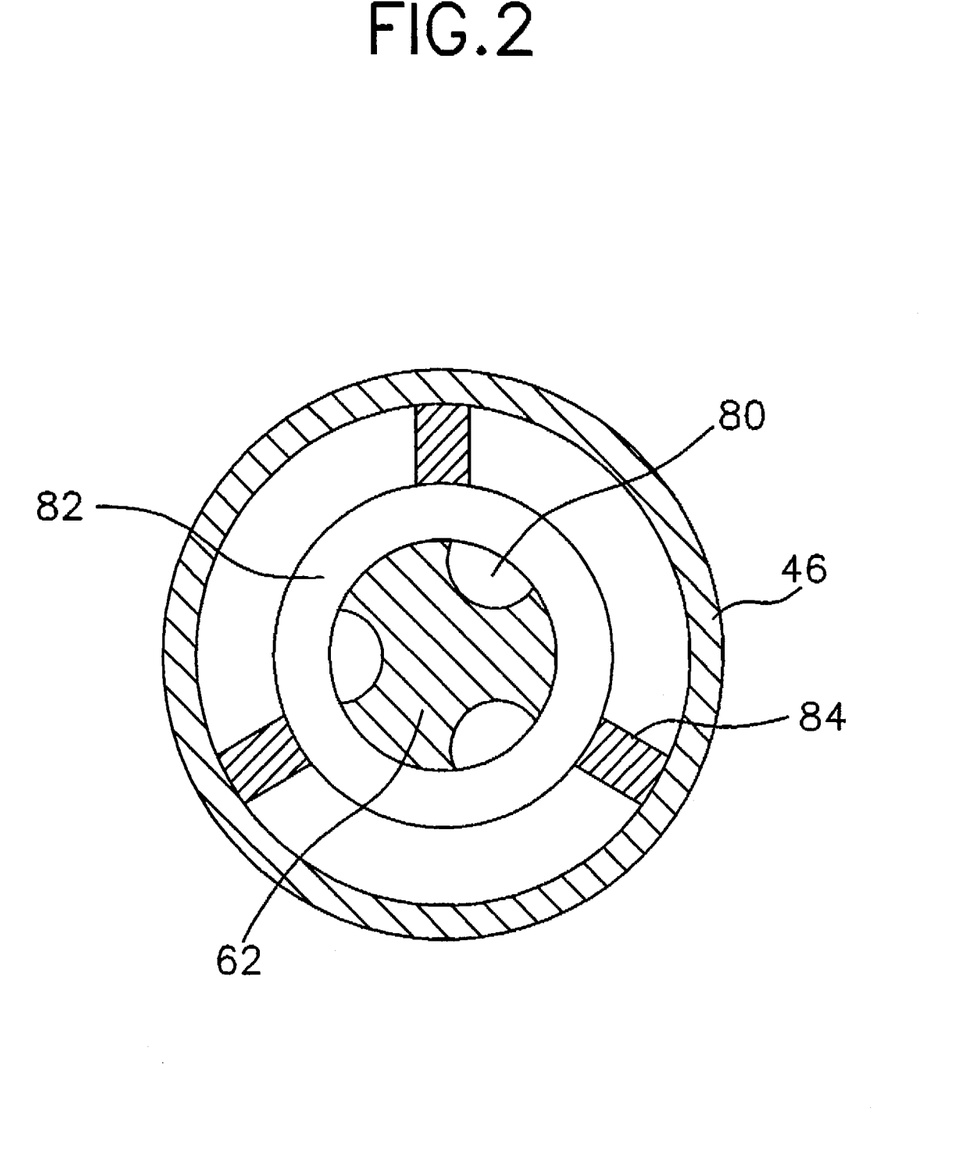
FIG. 2 is an enlarged partial sectional view taken along line A—A of FIG. 1.
Figure 3:
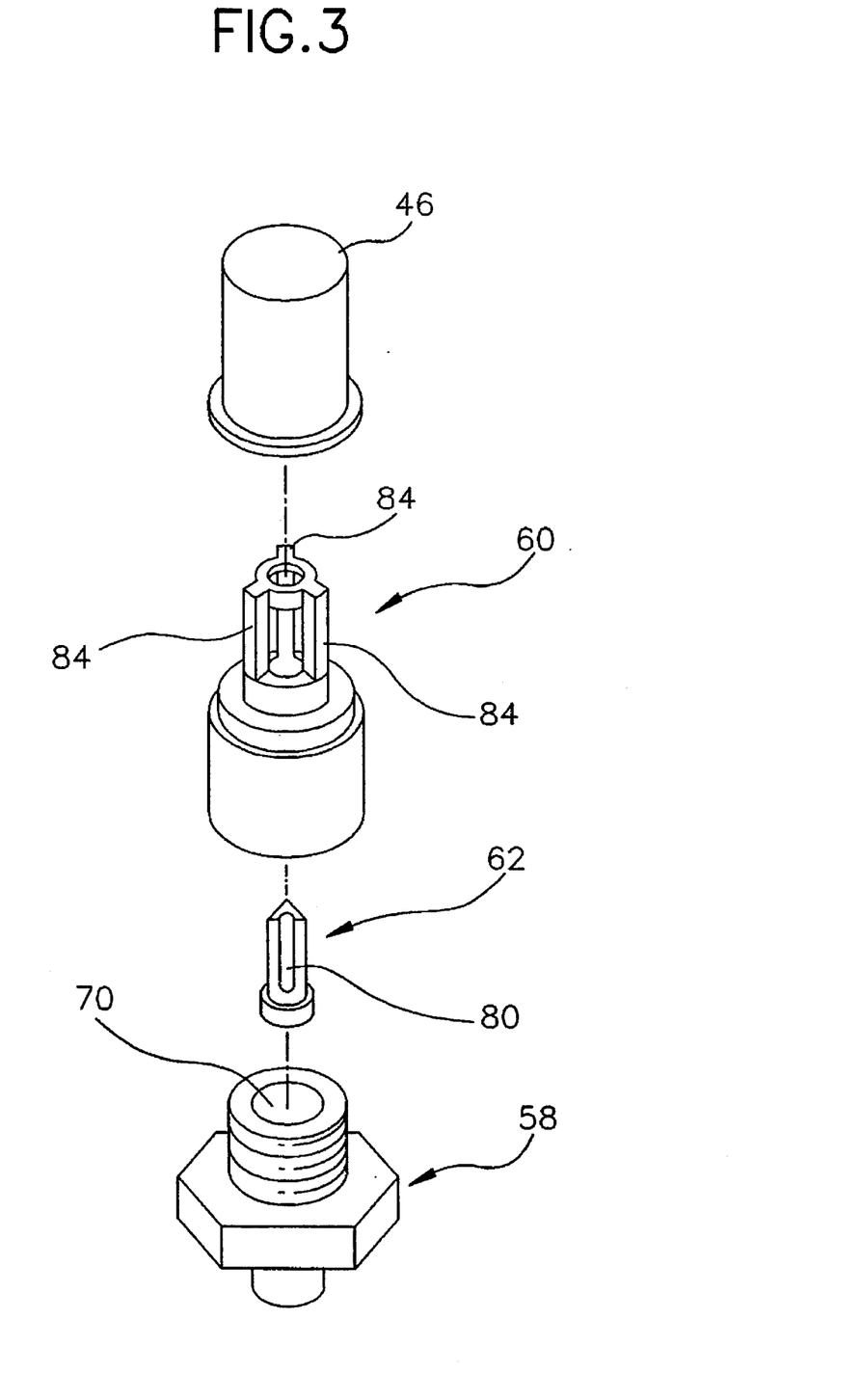
FIG. 3 is an exploded view of an actuator assembly having a straight-grooved projectile in accordance with the present invention.

With reference to FIGS. 1 to 3, the preferred embodiment of an inflating assembly according to the present invention will be described in detail.

The inflating assembly is formed of a pressured container 10 and an actuator assembly 20. Actuator assembly 20 is screwed to an end of pressured container 10 and extends both axially into and axially away from pressured container 10.

Pressured container 10 defines a generally cylindrical chamber 40 and is formed of a generally cylindrical one-piece housing 30, one end thereof being fully opened and the other end thereof being closed by a convex wall 34 which is curved toward the one end, and a cover 32 hermetically welded to the one end of housing 30. Chamber 40 is filled with gas at a predetermined pressure which is introduced into chamber 40 through a nozzle (not shown). A circular coupling opening 33 through which actuator assembly 20 is screwed is provided at the center of convex wall 30 of housing 30, and, at the center of cover 32, a circular outlet opening 36 is provided through which a pressured gas in container 10 blows out to inflate an airbag and which is coaxial with coupling opening 33. Outlet opening 36 is smaller in diameter than coupling opening 33. A burst disk 38 is formed of a domed central portion 42 and a flat portion 44 extended around central portion 42, and blocks the gas flow to airbag until bursting by means of actuator assembly 20. For this, flat portion 44 of burst disk 38 is hermetically welded to inner surface of cover 32 extended around outlet opening 36 to close it. Coupling opening 33 provided to convex wall 34 is closed by a generally cylindrical blocking cap 46 made of aluminum. Blocking cap 46 is disposed with its longitudinal central axis coincident with central axes of burst disk 38 and actuator assembly 20 inside pressured container 10, and one end of blocking cap 46 is hermetically welded to inner wall of housing 30.

Curved cover 32 is welded to a flat plate 52 to define a chamber 50, and a plurality of exhaust openings 48 are provided to flat plate 52 so that chamber 50 is communicated with the airbag. The number and size of exhaust openings 48 are not limited especially as long as the airbag system can operate smoothly. A flange 54 is secured to outer circumference of housing 30, and a plurality of mounting openings 56 is provided to flange 54. The inflating assembly is installed to a mounting space of vehicles with mounting opening 56. Further, flange 54 is secured to the mounting space by locking means together with the open end of the airbag, so that the open end of the airbag is supported by the locking means upon the inflation of the airbag.

Actuator assembly 20 is composed of a gas generating assembly 58, a plug 60 and a projectile 62. Gas generating assembly 58 includes a hollow casing 64 inside which a squib 66, a body 68 of pyrotechnic material and a sealing disk 70 are successively disposed in a coaxial relationship. Sealing disk 70 is coupled to a head end portion of casing 64 to seal it. Body 68 of pyrotechnic material is disposed within a cavity which is defined by sealing disk 70 and casing 64, and squib 66 is located adjacent to body 68 of pyrotechnic material. Two electrically conductive lead lines 71 and 72 are connected to squib 66. Lead lines 71 and 72 extend through casing 64 and through an opening in a tail end portion of casing 64 and are exposed outside casing 64. Lead lines 71 and 72 provide a path for electrical current to squib 66.

Plug 60 is screwed to gas generating assembly 58 and extends through coupling opening 33 which is formed in convex wall 34 to a closed end portion of blocking cap 46. Plug 60 is also screwed with convex wall 34 to be secured to container 10. Plug 60 is hollow and projectile 62 is received inside plug 60.

Projectile 62 has a cylindrical smaller-diameter rod portion 74 and a cylindrical larger-diameter stop end portion 76 which is provided integral and coaxial with rod portion 74. The end of rod portion 74 toward burst disk 38 tapers to a point. In order to enhance launching performance of projectile 62, a cylindrical recess 78 is formed at the end of stop end portion 76 which is mounted to be in contact with sealing disk 70. Three straight grooves 80 are formed on rod portion 74 along the longitudinal direction of projectile 62 in an equally angled relationship. The number and size of straight grooves 80 are not limited especially and are determined to actuate the airbag system effectively. Through straight grooves 80, a large portion of gases in container 10 blows out toward the airbag.

Figure 5:
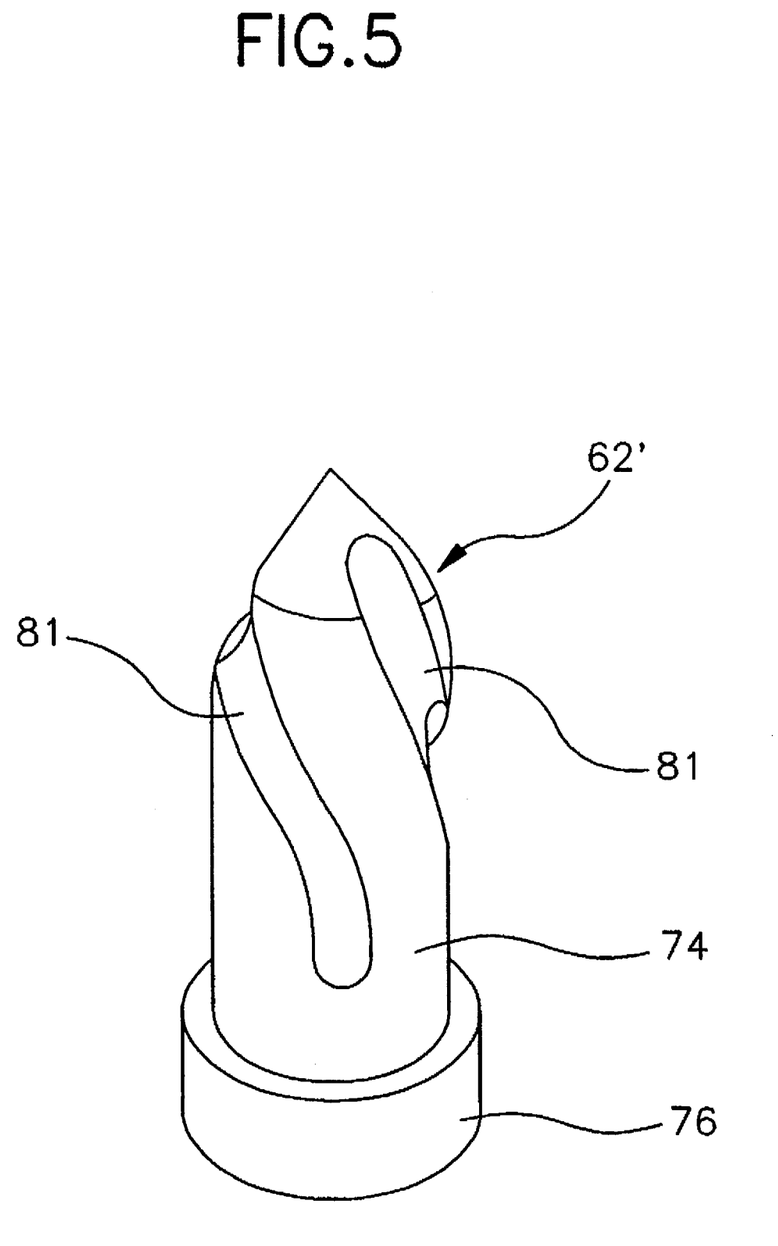
FIG. 5 is a perspective view of a spiral-grooved projectile employed in an inflating assembly of the present invention.

Another example of a projectile is shown in FIG. 5. A projectile 62' shown has three spiral grooves 81 which are formed on rod portion 74 along the longitudinal direction of projectile 62' in an equally angled relationship. Preferably, spiral grooves 81 are formed to rotate about 90 degrees to right-handed direction or left-handed direction. The number and size of spiral grooves 81 are not limited especially and are determined to actuate the airbag system effectively.

Plug 60 also includes a circular ring 82 which is provided at the end of plug 60 disposed in blocking cap 46 and is coaxial with projectile 62, and the inner diameter of ring 82 is determined so that rod portion 74 passes through ring 82 but stop end portion 76 does not. Therefore, the whole body of projectile 62 does not get out of plug 60 after launching. Ring 82 is connected with the other portion of plug 60 by three poles 84 which are preferably in an equally angled relationship. The number and size of poles 84 are not limited especially but it should be accomplished that a portion of the side wall of blocking cap 46 tears away when body 68 of pyrotechnic material explodes, gases generated by explosion are conducted in container 10 through torn portions of blocking cap 46 and these gases are sufficiently mixed with a gas stored in container 10.

As shown in FIG. 3, the fabrication of actuator assembly 20 is completed by inserting projectile 62 into plug 60 and then screwing plug 60 with gas generating assembly 58. The fabrication of the inflating assembly according to the present invention is completed by screwing actuator assembly 20 with container 10. The possibility of an explosive accident which may happen upon the fabrication of the inflating assembly lessens considerably because gas generating assembly 58 having body 68 of pyrotechnic material and container 10 storing a pressured gas are fabricated separate from each other, and the fabrication is easy because gas generating assembly 58 and plug 60 are screwed with each other and actuator assembly 20 and container 10 are also screwed as describer above.

Figure 4:
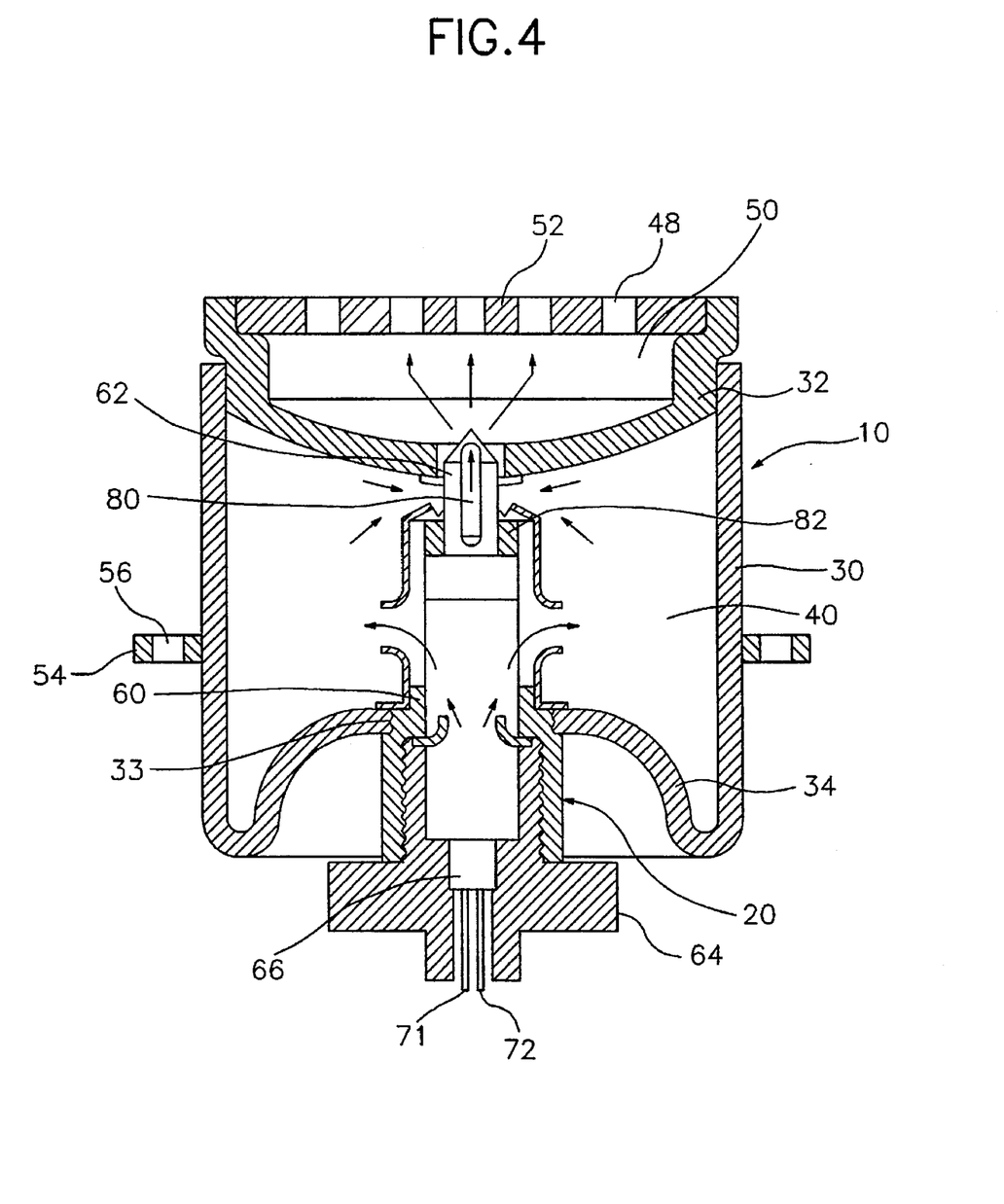
FIG. 4 is a sectional view of an inflating assembly in accordance with the present invention, showing a state after activation of the inflating assembly.

With reference to FIGS. 1 and 4, the operation of the hybrid inflating assembly according to the present invention will be described hereinafter. Upon the occurrence of sudden vehicle deceleration, a detector (not shown) included in the airbag system transmits an electrical signal to actuator assembly 20 through lead lines 71 and 72. Upon receipt of the electrical signal, squib 66 ignites and then body 68 of pyrotechnic material burns which is disposed adjacent to squib 66. Hot combustion gases resulting from burning of the pyrotechnic material compel projectile 62 to move from a retracted location as shown in FIG. 1 toward burst disk 38. After projectile 62 passes through a circular upper surface of blocking cap 46 and just before the tapered head end of burst disk 38 attains burst disk 38, the hot combustion gases tear away portions of side wall of blocking cap 46 through spaces formed between poles 84. Consequently, the hot combustion gases are introduced in container 10 through the torn portions of side wall of blocking cap 46. After this, projectile 62 ruptures burst disk 38 and then most gases in container 10 begin to be introduced to the airbag through straight grooves 80 formed on rod portion 74 of projectile 62. Alternatively, the inflating assembly of the present invention may be designed so that either burst disk 38 ruptures prior to tearing of the side wall of blocking cap 46 or burst disk 38 and blocking cap 46 rupture substantially simultaneously.

On the other hand, the hot combustion gases introduced into container 10 are mixed with the cold pressured gas to raise the pressure and temperature of container 10, and hence, air pressure is generated which is sufficient to inflate the airbag within a predetermined period.

When stop end portion 76 of launched projectile 62 comes in contact with ring 82 of plug 60, the movement of projectile 62 stops. Through a plurality of exhaust openings 48 provided to flat plate 52, gases to blow out from container 10 are supplied to the airbag to inflate it.

Figure 6:
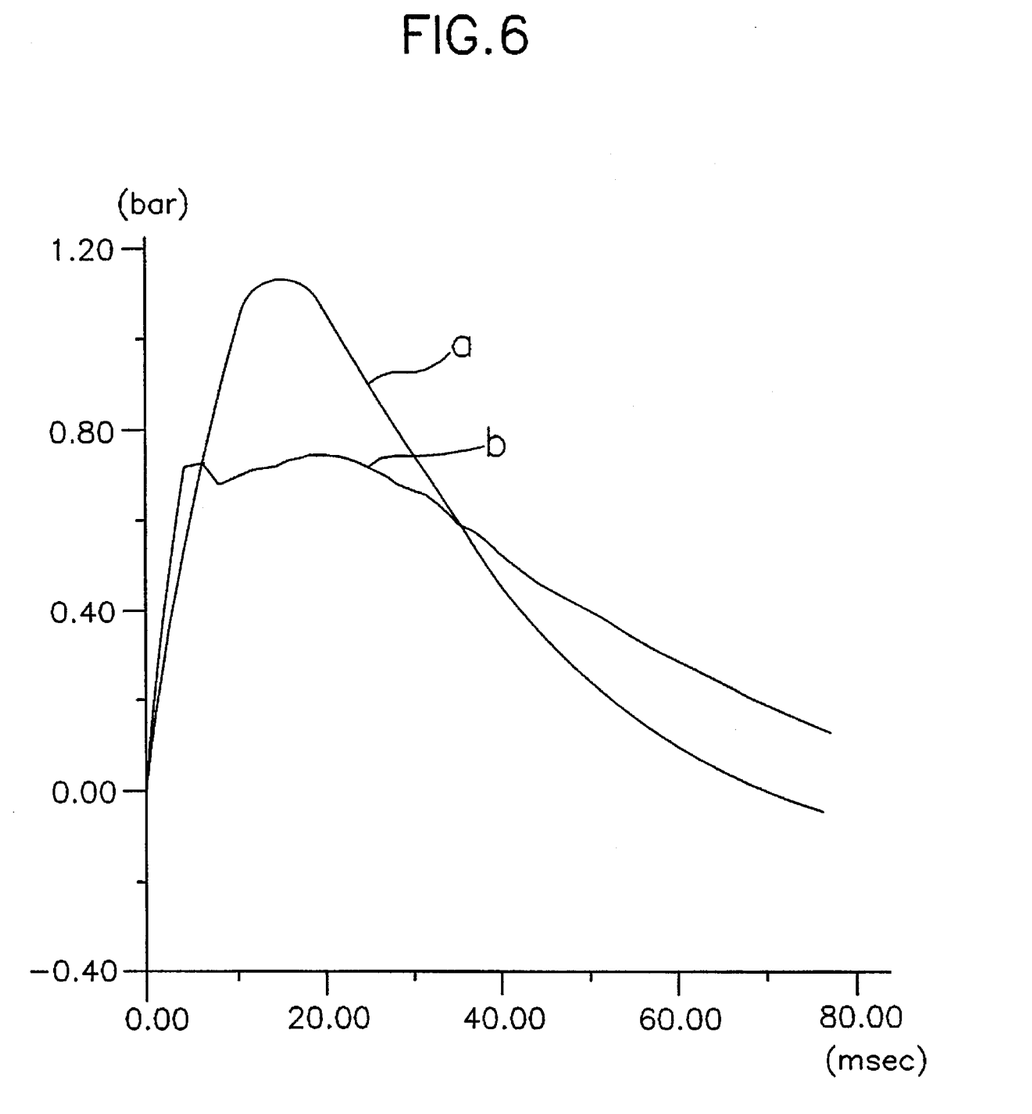
FIG. 6 is a graph resulting from testing of an inflating assembly in accordance with the present invention.

FIG. 6 illustrates a graph resulting from testing of the inflating assembly in accordance with the present invention. In testing, a tank of 60 liters was employed instead of the airbag and nitrogen gas as a pressured gas was employed. The traverse axis of the graph represents the time and the vertical axis thereof represents the pressure of the tank. Further, "a" represents the change of the pressure in the tank resulting from testing the inflating assembly with straight-grooved projectile 62, and "b" represents the change of the pressure in the tank resulting from testing the inflating assembly with spiral-grooved projectile 62'. As shown, the inflating assembly with spiral-grooved projectile 62' is better in performance than the inflating assembly with straight-grooved projectile 62, since the response time is shorter and the pressure descends more smoothly.

The inflating assembly according to the present invention has a consistent and controlled blowing-out performance of gases irrelevant to the ruptured shape of burst disk 38 by utilizing grooves formed on projectile 62 or 62' as a passageway of the flow. The fabrication is easy because gas generating assembly 58 and plug 60 are screwed with each other and actuator assembly 20 and container 10 also screwed, and the possibility of an explosive accident upon the fabrication lessens considerably because actuator assembly 20 having body 68 of pyrotechnic material and container 10 are fabricated separate from each other. Further, the reduced manufacturing cost results from the simple structure of the inflating assembly.

Figure 7:
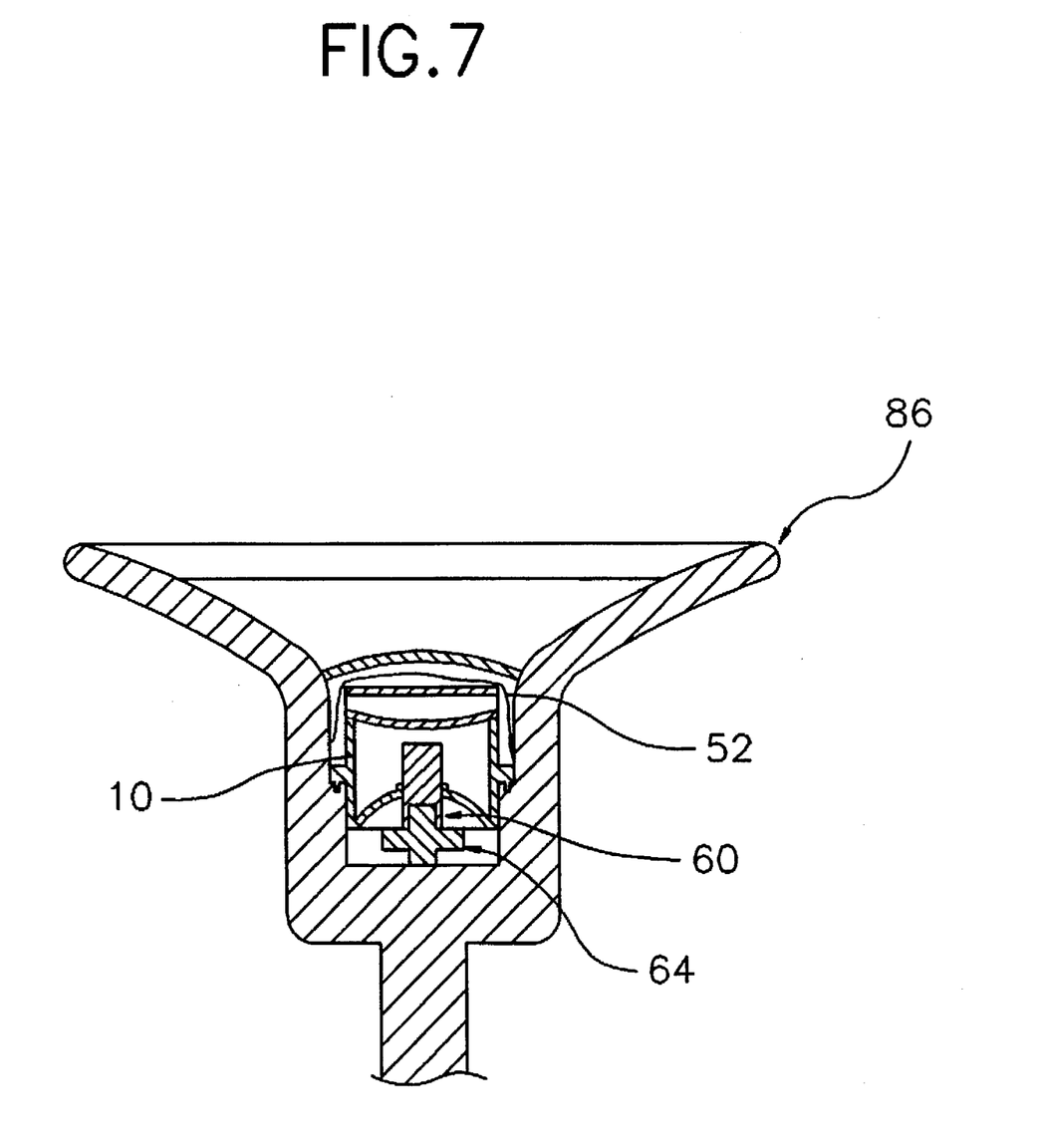
FIG 7 is a schematic sectional view for showing an inflating assembly disposed on mounting place of a steering handle portion of vehicles.

FIG. 7 is a schematic sectional view for showing an inflating assembly disposed on mounting place of a steering handle portion 86 of vehicles. That is, the inflating assembly of the present invention is shorter in length than the conventional inflating assembly, and hence, can be utilized in the airbag system for drivers as well as that for passengers.

While the present invention has been particularly shown and described with reference to particular embodiment thereof, it will be understood by those skilled in the art that various changes and modifications may be effected therein without departing from the spirit and scope of the invention as defined by the appended claims.

What is claimed is:

1. An inflator for an airbag system in an automotive vehicle comprising:

pressured container means having a first opening and a second opening opposite to said first opening for storing gas under pressure;

blocking means for blocking a gas flow toward an airbag in a normal state in which the airbag is kept deflated, said blocking means being secured to said container means to close said first opening provided at one end of said container means;

projectile means located coaxially opposite to said blocking means for being launched by burning a propellant and rupturing said blocking means to inflate the airbag;

hollow guiding means for containing said projectile means and guiding said projectile means toward said blocking means, said guiding means having a chamber for receiving said projectile means and moving said projectile means toward said blocking means and being coupled with said container means through said second opening which is provided at another end of said container means opposite to said one end thereof so that a portion of said guiding means is received inside said container means;

hollow casing means being coaxially coupled with one end portion of said guiding means outside said container means and retaining a propellant to generate combustion gases;

sealing means for sealing said second opening through which said guiding means is coupled so that the gas under pressure can be stored within said container means, said sealing means being hermetically coupled with an inner wall of said container means to cover said guiding means; and ignition means for igniting said propellant, said ignition means being disposed in said chamber inside said casing means adjacent to said propellant, wherein said projectile means includes a rod portion and a stop end portion larger in diameter than said rod portion, an end of said rod portion tapers to a point to rupture said blocking means easily, and a plurality of grooves functioning as passageways for gas flow are formed on said rod portion along a longitudinal direction thereof, wherein said guiding means includes, at an end portion thereof opposite to said blocking means, a ring portion through which said rod portion passes but said stop end portion does not pass, and said ring portion is connected with a body of said guiding means by a plurality of poles, whereby hot combustion gases generated by burning of said propellant tear away portions of a side wall of said sealing means through spaces formed between said poles, and said combustion gases are mixed with the gas under pressure stored in said container means.

2. The inflator as claimed in claim 1, wherein said sealing means has a hollow cylindrical shape of which one end is closed and the other end is open and is hermetically welded to the inner wall of said container means.

3. The inflator as claimed in claim 1, wherein said container means is threadedly engaged with said guiding means and said casing means is also threadedly engaged with said guiding means.

4. The inflator as claimed in claim 1, wherein said blocking means is a disk formed of a domed central portion and a flat portion extended around said central portion, and said flat portion is hermetically welded to said container means.

5. The inflator as claimed in claim 1, wherein an end of said casing means extending toward said guiding means is sealed by a sealing disk, said sealing disk and inner walls of said casing means define a cavity in which said propellant and said ignition means are disposed successively, and said ignition means is located adjacent to said propellant.

6. The inflator as claimed in claim 1, wherein said container means is cylindrical and has opposite ends which are curved toward the inside of said container means, said first opening is formed at one curved end of said container means, said second opening is formed at the other curved end thereof coaxial with said first opening, and a flange portion is secured to the outer circumference of said container means and includes a plurality of mounting openings.

7. The inflator as claimed in claim 6, wherein a circular flat plate is coupled to the one curved end of said container means including said first opening to define a chamber, said chamber being communicated with said container means through said first opening, and said flat plate includes a plurality of exhaust openings through which said chamber is communicated with the airbag.

8. The inflator as claimed in claim 1, wherein said grooves are extended straight.

9. The inflator as claimed in claim 1, wherein said grooves are spirally extended.

10. An inflator for an airbag system in an automotive vehicle comprising:

pressured container means having a first opening and a second opening opposite to said first opening for storing gas under pressure;

blocking means for blocking a gas flow toward an airbag in a normal state in which the airbag is kept deflated, said blocking means being secured to said container means to close said first opening provided at one end of said container means;

projectile means located coaxially opposite to said blocking means for being launched by burning a propellant and rupturing said blocking means to inflate the airbag;

hollow guiding means for containing said projectile means and guiding said projectile means toward said blocking means, said guiding means having a chamber for receiving said projectile means and moving said projectile means toward said blocking means and being coupled with said container means through said second opening which is provided at another end of said container means opposite to said one end thereof so that a portion of said guiding means is received inside said container means;

hollow casing means being coaxially coupled with one end portion of said guiding means outside said container means and retaining a propellant to generate combustion gases;

sealing means for sealing said second opening through which said guiding means is coupled so that the gas under pressure can be stored within said container means, said sealing means being hermetically coupled with an inner wall of said container means to cover said guiding means; and ignition means for igniting said propellant, said ignition means being disposed in said chamber inside said casing means adjacent to said propellant, wherein said projectile means includes a rod portion and a stop end portion larger in diameter than said rod portion, an end of said rod portion tapers to a point to rupture said blocking means easily, and a plurality of grooves functioning as passageways for gas flow are formed on said rod portion along a longitudinal direction thereof, wherein said sealing means has a hollow cylindrical shape of which one end is closed and the other end is open and is hermetically welded to the inner wall of said container means, wherein said guiding means includes, at an end portion thereof opposite to said blocking means, a ring portion through which said rod portion passes but said stop end portion does not pass, and said ring portion is connected with a body of said guiding means by a plurality of poles, whereby hot combustion gases generated by burning of said propellant tear away portions of a side wall of said sealing means through spaces formed between said poles, and said combustion gases are mixed with the gas under pressure stored in said container means, wherein said container means is threadedly engaged with said guiding means and said casing means is also threadedly engaged with said guiding means, wherein said blocking means is a disk formed of a domed central portion and a flat portion extended around said central portion, and said flat portion is hermetically welded to said container means, wherein an end of said casing means extending toward said guiding means is sealed by a sealing disk, said sealing disk and inner walls of said casing means define a cavity in which said propellant and said ignition means are disposed successively, and said ignition means is located adjacent to said propellant, wherein said container means is cylindrical and has opposite ends which are curved toward the inside of said container means, said first opening is formed at one curved end of said container means, said second opening is formed at the other curved end thereof coaxial with said first opening, and a flange portion is secured to the outer circumference of said container means and includes a plurality of mounting openings, wherein a circular flat plate is coupled to the one curved end of said container means including said first opening to define a chamber, said chamber being communicated with said container means through said first opening, and said flat plate includes a plurality of exhaust openings through which said chamber is communicated with the airbag.

* * * * *